(12) United States Patent
Kim et al.

(10) Patent No.: US 9,140,564 B2
(45) Date of Patent: Sep. 22, 2015

(54) APPARATUS OF ESTABLISHING LANE INFORMATION USING DRIVING INFORMATION OF VEHICLE AND METHOD OF ESTABLISHING THE SAME

(71) Applicant: Hyundai Motor Company, Seoul (KR)

(72) Inventors: Sung Yun Kim, Seoul (KR); Suk Young Rho, Anyang-si (KR); Jung Hoon Oh, Yongin-si (KR); Hyo Geun Kwak, Daegu (KR); Min Wook Seo, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 86 days.

(21) Appl. No.: 13/894,137

(22) Filed: May 14, 2013

(65) Prior Publication Data
US 2014/0145864 A1  May 29, 2014

(30) Foreign Application Priority Data

Nov. 27, 2012 (KR) .......................... 10-2012-0135331

(51) Int. Cl.
*G08G 1/123* (2006.01)
*G01C 21/32* (2006.01)
*G08G 1/01* (2006.01)

(52) U.S. Cl.
CPC .............. *G01C 21/32* (2013.01); *G08G 1/0112* (2013.01); *G08G 1/0129* (2013.01)

(58) Field of Classification Search
CPC ..... G08G 1/09; G08G 1/0112; G08G 1/0129; G08G 1/20; G08G 1/123; G08G 1/205; G08G 1/00; G01C 21/32; G01C 21/00
USPC ................. 340/988, 990, 905, 995.14, 995.1; 701/301, 409, 437, 461, 214
See application file for complete search history.

(56) References Cited

U.S. PATENT DOCUMENTS

| | | | |
|---|---|---|---|
| 6,640,187 B1 * | 10/2003 | Chenault et al. ............... | 701/409 |
| 6,853,913 B2 * | 2/2005 | Cherveny et al. ............. | 701/461 |
| 7,990,286 B2 * | 8/2011 | Shankwitz et al. ........... | 340/988 |
| 8,209,114 B2 * | 6/2012 | Ishikawa et al. .............. | 701/118 |
| 2002/0080618 A1 * | 6/2002 | Kobayashi et al. ........... | 362/466 |
| 2006/0095349 A1 | 5/2006 | Morgan et al. | |
| 2008/0033632 A1 | 2/2008 | Lee | |
| 2010/0238009 A1 * | 9/2010 | Cook et al. .................... | 340/439 |

FOREIGN PATENT DOCUMENTS

| | | | |
|---|---|---|---|
| JP | 2002-225657 A | 8/2002 | |
| JP | 2006-072925 A | 3/2006 | |
| KR | 10-0508974 B1 | 8/2005 | |
| KR | 10-0717311 B1 | 5/2007 | |
| KR | 10-2007-0120085 A | 12/2007 | |
| KR | 10-0867592 B1 | 11/2008 | |

* cited by examiner

*Primary Examiner* — Anh V La
(74) *Attorney, Agent, or Firm* — McDermott Will & Emery LLP

(57) ABSTRACT

An apparatus for establishing lane information using driving information of a vehicle is provided. The apparatus comprises a map information storing unit storing digital map information and a driving information collecting unit collecting driving information from a plurality of vehicles. An accumulating and compiling statistics unit accumulates the driving information of each vehicle collected by the driving collecting unit and then compiles statistics on the accumulated driving information. A controlling unit generates lane information based on a statistics result of the accumulating and compiling statistics unit and the digital map information. A lane information database stores the lane information generated by the controlling unit.

8 Claims, 3 Drawing Sheets

APPARATUS OF ESTABLISHING LANE INFORMATION USING DRIVING INFORMATION OF VEHICLE AND METHOD OF ESTABLISHING THE SAME

CROSS-REFERENCE TO RELATED APPLICATION

This application is based on and claims priority of Korean Patent Application No. 10-2012-0135331, filed on Nov. 27, 2012 in the Korean Intellectual Property Office, the disclosure of which is incorporated herein by reference in its entirety.

TECHNICAL FIELD

The present disclosure relates to an apparatus of establishing lane information using driving information of a vehicle and a method of establishing the same, and more particularly, to technology establishing the lane information based on accumulated and compiled statistics of the driving information collected from a plurality of vehicles.

BACKGROUND

It is difficult to establish a lane information database for a network of roads intricately connected to one another on a national scale. Particularly, it is difficult to establish the lane information in every lane of each road.

To this end, a vehicle equipped with equipment such as front/rear/left/right radars, a yaw rate sensor, a roll rate sensor, a pitch rate sensor, front and rear cameras, a global positioning system-dead reckoning (GPS-DR), and the like generally needs to drive on a network of roads in all parts of the country in addition to every lane in order to establish the lane information. This is a very inefficient method and can not be implemented in actuality.

Here, the GPS-DR using a principle of an inertial navigation system is a system measuring a relative position of the vehicle using a gyro sensor, a wheel sensor, a speed sensor, an acceleration sensor, and the like.

In addition, when a front and rear, a top and bottom, and a right and left axes are referred to as X, Z, and Y axes, respectively, a rotary motion based on each axis is referred to as a roll, a yaw, and a pitch, respectively.

In order to solve the foregoing problem, there is a long-felt need in the art for a method capable of collecting driving information for a plurality of vehicles in which mobile communication or wireless LAN communication and establishing the lane information based on the collected driving information.

SUMMARY

Accordingly, the present disclosure solves the above-mentioned problems occurring in the prior art while advantages achieved by the prior art are maintained intact.

One subject to be achieved by the present disclosure is to provide an apparatus for establishing lane information using driving information of a vehicle and a method of establishing the same capable of allowing an information collection vehicle equipped with a high cost equipment without driving in every lane of the many roads of the country. The present disclosure also rapidly establishes the lane information based on accumulated and compiled statistics of the driving information collected from a plurality of vehicles.

In one aspect of the present disclosure, there is provided an apparatus for establishing lane information using driving information of a vehicle. The apparatus includes a map information storing unit storing digital map information and a driving information collecting unit collecting driving information from a plurality of vehicles. An accumulating and compiling statistics unit accumulates the driving information of each vehicle collected by the driving collecting unit and then compiles statistics on the accumulated driving information. A controlling unit generates lane information based on a statistics result of the accumulating and compiling statistics unit and the digital map information. A lane information database stores the lane information generated by the controlling unit.

In another aspect of the present disclosure, a method of establishing lane information using driving information of a vehicle is provided. The method includes storing, by a map information storing unit, digital map information and collecting, by a driving information collecting unit, driving information from a plurality of vehicles. The method further comprises accumulating, by an accumulating and compiling statistics unit, the collected driving information of each vehicle and then compiling statistics on the accumulated driving information. Furthermore, a controlling unit generates lane information based on the statistics result and the digital map information, and stores, by the lane information database, the generated lane information.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
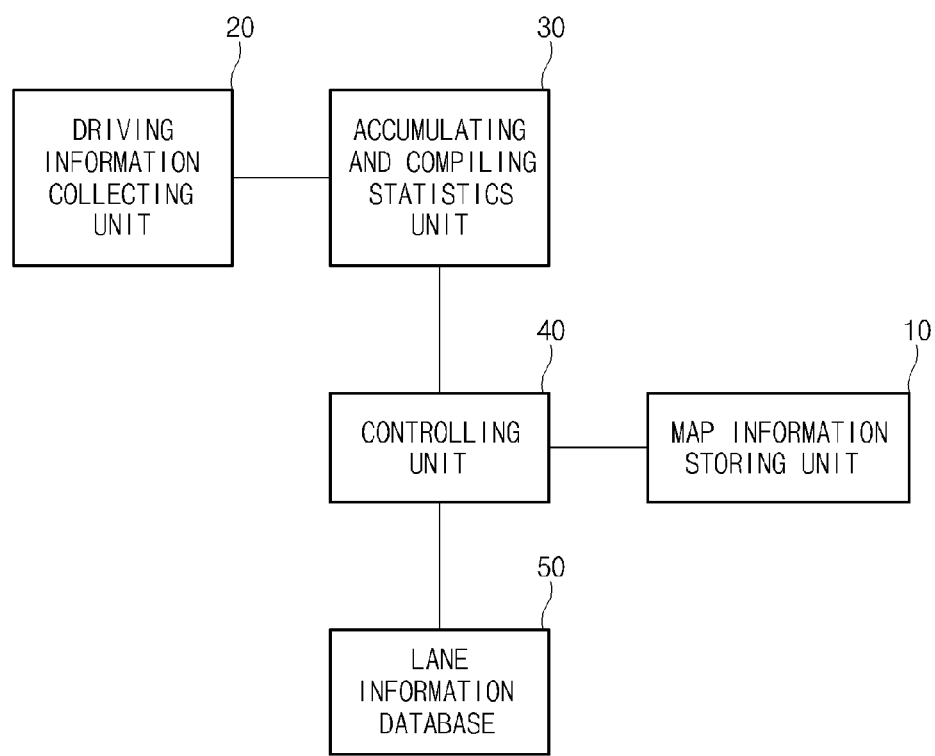
FIG. 1 is a configuration diagram showing an apparatus of establishing lane information using driving information of a vehicle according to an embodiment of the present disclosure.

FIG. 1 is a configuration diagram showing an apparatus of establishing lane information using driving information of a vehicle according to an embodiment of the present disclosure.

As shown in FIG. 1, the apparatus for establishing the lane information using driving information of a vehicle according to an embodiment of the present disclosure includes a map information storing unit 10, a driving information collecting unit 20, an accumulating and compiling statistics unit 30, a controlling unit 40, and a lane information database 50.

The above-mentioned respective components will be described. First, the map information storing unit 10 stores digital map information applied to a navigation system and the like. The above-mentioned digital map information includes the number of lanes of each road, nodes including crossroads and interchanges (ICs), and a link indicating a line (a path) connecting between the nodes for a network of roads of all parts of a country. In this case, a network of roads are configured of a collection of nodes and links.

In addition, the digital map information includes position information of each road such as longitude, latitude, and altitude, and shape information (gradient and the like) of the road.

Next, the driving information collecting unit 20 collects the driving information from a plurality of vehicles randomly driving on a network of roads in all parts of the country. The driving information includes, as position information of the vehicle, the longitude, the latitude, and the altitude which may be obtained by a global positioning system (GPS), and reliability information of the position information. In addition, the driving information includes, as behavior information of the vehicle, yaw rate, roll rate, and pitch rate as well as speed, and further includes, as time information, universal time coordinates (UTC).

The reliability information includes the precision of the longitude, the latitude, and the altitude obtained by the GPS. For example, the precision of the GPS outputs of longitude, latitude, and altitude vary according to the number of GPS satellites searched.

The accumulating and compiling statistics unit 30 subsequently accumulates the driving information of each vehicle collected from the driving information collecting unit 20 and then compiles statistics on the accumulated driving information. That is, the accumulating and compiling statistics unit 30 accumulates, in every link, the driving information collected from a number of vehicles passing through the link and compiles statistics on the accumulated driving information. An example of a result, in which statistics are accumulated and compiled, as described above, is shown in FIG. 2.

Figure 2:
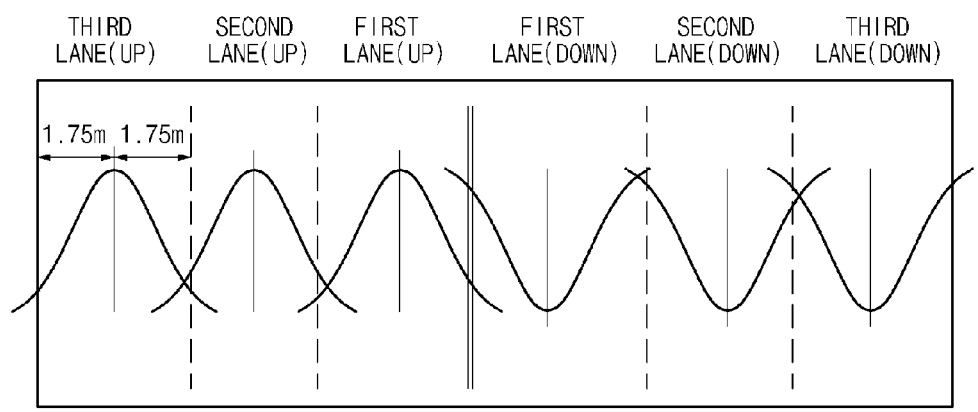
FIG. 2 is an exemplary diagram showing a result of accumulating and compiling statistics on any link according to the present disclosure.

FIG. 2 is an exemplary diagram showing a result of accumulated and compiled statistics on any link according to the present disclosure.

As shown in FIG. 2, the accumulated and compiled statistics on any link is calculated. As a result, the total of six graphs indicating distribution of a point driven by each vehicle is calculated. In this case, a peak point of each accumulated distribution means that the number of vehicles passing through the point is higher than that of other points. When accumulating and compiling statistics, different weights may be applied according to the reliability information.

The controlling unit 40 subsequently generates lane information based on the statistics result of the accumulating and compiling statistics unit 30 and the digital map information stored in the map information storing unit 10. That is, the controlling unit 40 matches the position information and the behavior information with each other in every lane of each road and stores the matched information in the lane information database 50 as the lane information.

In general, since a width of a lane is 3.5 m, a width of 1.75 m from a right side and a width of 1.75 m from a left side based on the peak point form one lane. Therefore, the link has the total of six lanes. Further, since up and down lanes may be understood by the driving information (the roll rate and the like), it may be appreciated that the link is three lanes in one-way and six lanes in two-ways.

In addition, in this case, when the plurality of vehicles driving on any lane turn to the left (for, example, it may be grasped by the behavior information), the corresponding lane is identified as a first lane, and when the plurality of vehicles driving on any lane turn to the right, the corresponding lane is identified as a final lane.

In addition, the controlling unit 40 may validate the lane information generated by comparing the number of lanes of the corresponding link in the digital map information.

The lane information database 50 established as described above may be used later for recognizing a lane on which the vehicle drives when providing a customized service in every lane of the road.

Figure 3:
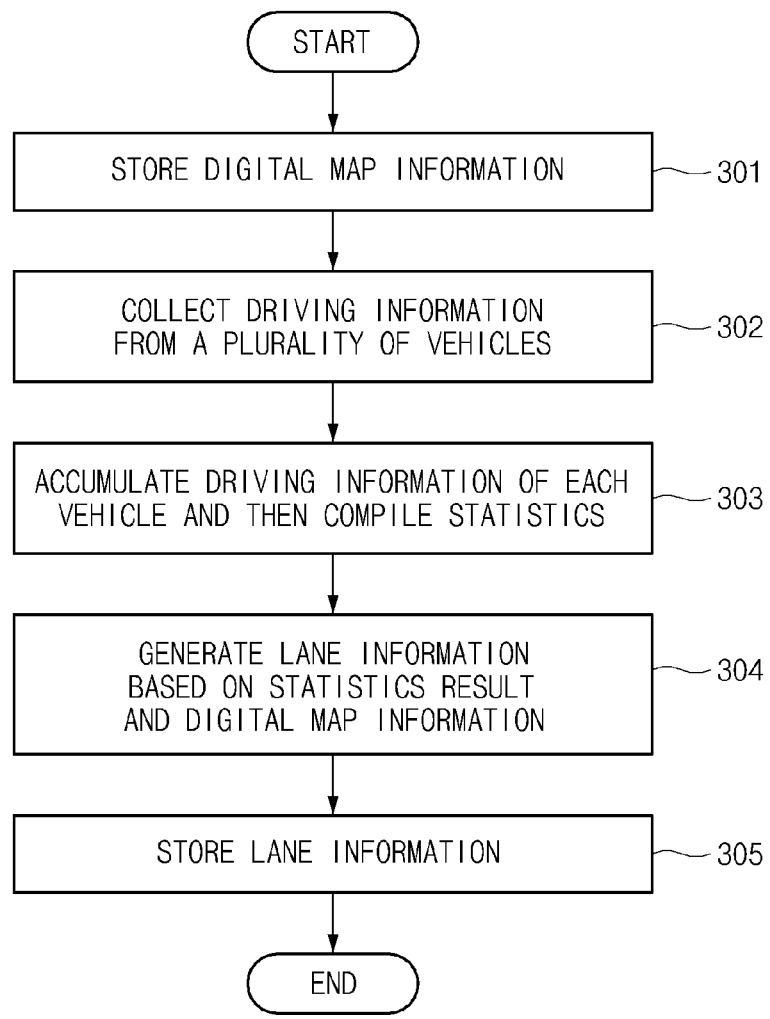
FIG. 3 is a flowchart of a method of establishing lane information using driving information of a vehicle according to an embodiment of the present disclosure.

FIG. 3 is a flowchart of a method of establishing road information using driving information of a vehicle according to an embodiment of the present disclosure.

First, the map information storing unit 10 stores the digital map information (301).

Next, the driving information collecting unit 20 collects the driving information from a plurality of vehicles (302).

Next, the accumulating and compiling statistics unit 30 accumulates the driving information of each vehicle collected by the driving information collecting unit 20 and then compiles statistics on the accumulated driving information (303).

Next, the controlling unit 40 generates lane information based on the statistics result of the accumulating and compiling statistics unit 30 and the digital map information (304).

Next, the lane information database 50 stores the lane information generated by the controlling unit 40 (305).

According to the present disclosure, an apparatus for establishing lane information using driving information of a vehicle and a method of establishing the same may allow an information collection vehicle equipped with high cost equipment to not have to drive in every lane on many roads of the country. The present disclosure also rapidly establishes the lane information based on accumulated and compiled statistics of the driving information collected from a plurality of vehicles.

In addition, a customized service in every lane of each road may be provided later by establishing the lane information based on the accumulated and compiled statistics of the driving information collected from the plurality of vehicles.

In addition, the precision of a GPS may be supplemented by establishing the lane information based on the accumulated and compiled statistics of the driving information collected from the plurality of vehicles.

What is claimed is:

1. An apparatus for establishing lane information using driving information of a vehicle, comprising:
   a map information storing unit storing digital map information;
   a driving information collecting unit collecting driving information from a plurality of vehicles;
   an accumulating and compiling statistics unit accumulating the driving information of each vehicle collected by the driving collecting unit and then compiling statistics on the accumulated driving information;
   a controlling unit generating a number of lanes based on a statistics result of the accumulating and compiling statistics unit and the digital map information; and
   a lane information database storing the number of lanes generated by the controlling unit,
   wherein the driving information includes position information and behavior information.

2. The apparatus for establishing lane information according to claim 1, wherein the driving information includes, as position information, longitude, latitude, altitude, and reliability information of the position information, and includes, as behavior information, yaw rate, roll rate, pitch rate, and speed.

3. The apparatus for establishing lane information according to claim 1, wherein the controlling unit validates the number of lanes generated by comparing the number of lanes of a corresponding link in the digital map information.

4. The apparatus for establishing lane information according to claim 2, wherein the controlling unit validates the number of lanes generated by comparing the number of lanes of a corresponding link in the digital map information.

5. A method for establishing lane information using driving information of a vehicle, the method comprising:
- storing, by a map information storing unit, digital map information;
- collecting, by a driving information collecting unit, driving information from a plurality of vehicles;
- accumulating, by an accumulating and compiling statistics unit, the collected driving information of each vehicle and then compiling statistics on the accumulated driving information;
- generating, by a controlling unit, a number of lanes based on a statistics result and the digital map information; and
- storing, by the lane information database, the generated number of lanes,
- wherein the driving information includes position information and behavior information.

6. The method for establishing lane information according to claim 5, wherein the driving information includes longitude, latitude, and altitude as position information and reliability information of the position information, and includes yaw rate, roll rate, pitch rate, and speed as behavior information.

7. The method for establishing lane information according to claim 5, further comprising validating, by the controlling unit, the number of lanes generated by comparing the number of lanes of a corresponding link in the digital map information.

8. The method for establishing lane information according to claim 6, further comprising validating, by the controlling unit, the number of lanes generated by comparing the number of lanes of a corresponding link in the digital map information.

* * * * *